W. B. JACKSON.
Horse Hay-Rake.
No. 202,173. Patented April 9, 1878.
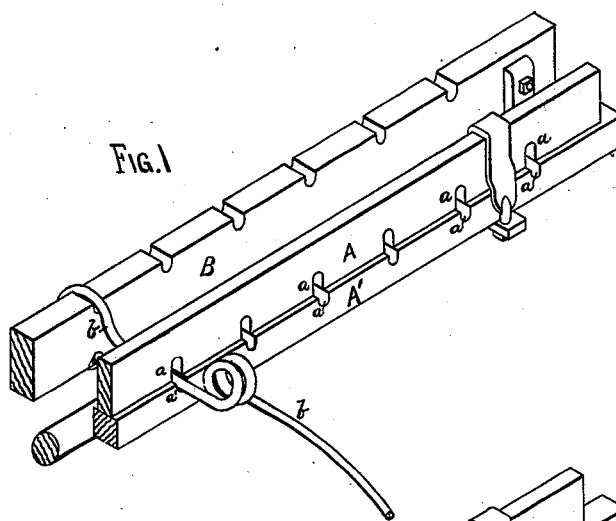
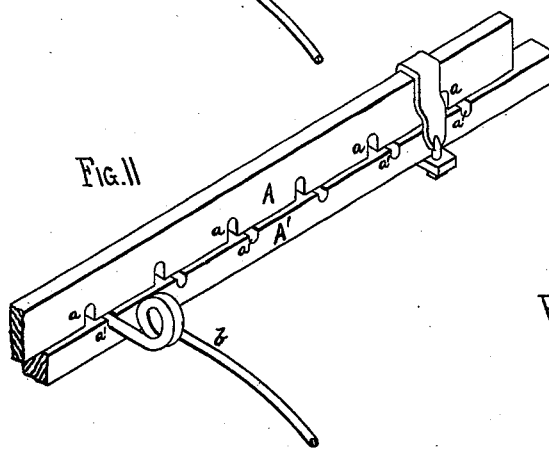
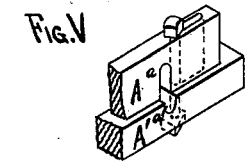
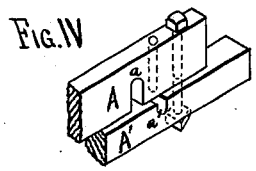
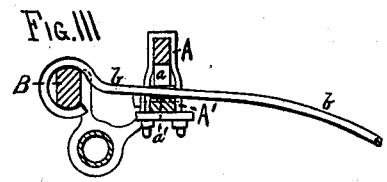
WITNESSES.
C. N. Woodward.
J. Henry Fitz
INVENTOR, William Blake Jackson,
BY Louis Feeser & Co.
Atty's.

UNITED STATES PATENT OFFICE.

WILLIAM BLAKE JACKSON, OF MINNEAPOLIS, MINNESOTA.

IMPROVEMENT IN HORSE HAY-RAKES.

Specification forming part of Letters Patent No. 202,173, dated April 9, 1878; application filed January 7, 1878.

*To all whom it may concern:*

Be it known that I, WILLIAM BLAKE JACKSON, of Minneapolis, in the county of Hennepin and State of Minnesota, have invented certain new and useful Improvements in Horse Hay-Rakes, which improvement is fully set forth in the annexed specification and accompanying drawings, in which—

Figure 1 is a perspective view of a portion of an axle, rake-head, and slotted tooth-bar of a horse hay-rake. Fig. 2 is a perspective view of a portion of the slotted tooth-bar detached. Fig. 3 is a cross-section of Fig. 1. Figs. 4 and 5 are detail views.

This invention relates to horse hay-rakes; and consists in the manner of forming the slotted tooth-bar through which the teeth pass, whereby a drop or loose tooth and a fixed or rigid tooth may be combined in one rake, and by the use of one tooth-bar, as hereinafter described.

In using horse hay-rakes on rough or uneven ground, it is found advantageous to allow a slight perpendicular play to the teeth, while on even, smooth ground the fixed or rigid teeth are found to operate best. This has heretofore rendered it necessary to use two separate rakes; but my improvement is intended to combine in one rake movable and rigid teeth by the use of one tooth-bar. This I accomplish by forming the slotted bar in two sections, A A', divided longitudinally, and providing each section with slots or notches $a$ $a'$, of such a length that when they are placed opposite each other they will allow each tooth $b$ a small degree of vertical play, as in ordinary drop-tooth rakes, (see Figs. 1, 3, and 5,) while if the upper section A is moved endwise until the slots are broken, the teeth will be held rigidly in the notches in the lower section A', as in the ordinary rigid-tooth rake, (see Figs. 2 and 4,) the solid portions between the notches in the upper section A forming the tops of the notches in the lower section A'.

The two sections will be secured together by any suitable means that will allow one of them a slight end movement.

The same result may be obtained by reversing the upper section A; but I prefer the method shown as being more simple and less troublesome to operate.

The teeth may be secured to the rake-head B by any of the well-known methods.

I claim—

The tooth-bar formed in two sections, A A', and provided with slots or notches $a$ $a'$, one section being made adjustable longitudinally, and adapted to either hold the teeth rigidly in place or allow them a vertical movement, in the manner and for the purpose substantially as hereinbefore set forth.

In testimony whereof I have hereunto set my hand in the presence of two subscribing witnesses.

WILLIAM BLAKE JACKSON.

Witnesses:
C. N. WOODWARD,
J. HENRY FITZ.